United States Patent
Kayacik

(10) Patent No.: US 11,280,435 B2
(45) Date of Patent: Mar. 22, 2022

(54) PROFILE CLAMP COMPRISING A SEALING ELEMENT, SEALING ELEMENT FOR A PROFILE CLAMP AND CONDUIT CONNECTION ASSEMBLY COMPRISING A PROFILE CLAMP OF THIS TYPE

(71) Applicant: NORMA Germany GmbH, Maintal (DE)

(72) Inventor: Erkan Kayacik, Istanbul (TR)

(73) Assignee: Norma Germany GmbH, Maintal (DE)

( * ) Notice: Subject to any disclaimer, the term of this patent is extended or adjusted under 35 U.S.C. 154(b) by 538 days.

(21) Appl. No.: 16/082,046

(22) PCT Filed: Feb. 14, 2017

(86) PCT No.: PCT/EP2017/053330
§ 371 (c)(1),
(2) Date: Sep. 4, 2018

(87) PCT Pub. No.: WO2017/148700
PCT Pub. Date: Sep. 8, 2017

(65) Prior Publication Data
US 2020/0292113 A1    Sep. 17, 2020

(30) Foreign Application Priority Data
Mar. 1, 2016   (DE) .......................... 102016103687.0

(51) Int. Cl.
*F16L 23/00*     (2006.01)
*F16L 23/08*     (2006.01)
(Continued)

(52) U.S. Cl.
CPC .......... *F16L 23/003* (2013.01); *F16J 13/065* (2013.01); *F16L 23/08* (2013.01); *F16L 23/18* (2013.01)

(58) Field of Classification Search
CPC ......... F16L 23/003; F16L 23/08; F16L 23/18; F16L 23/04; F16L 23/10; F16L 23/036;
(Continued)

(56) References Cited

U.S. PATENT DOCUMENTS

| 949,658 A | 2/1910 | Randall |
| 1,479,317 A | 1/1924 | Peirce |

(Continued)

FOREIGN PATENT DOCUMENTS

| DE | 1650200 A1 | 2/1972 |
| DE | 2851566 | 6/1980 |

(Continued)

OTHER PUBLICATIONS

Office Action issued by European Patent Office for Application No. 17705603.3 dated Jan. 28, 2020 (7 pages).

(Continued)

*Primary Examiner* — Matthew Troutman
*Assistant Examiner* — William S. Choi
(74) *Attorney, Agent, or Firm* — Reising Ethington, P.C.

(57) ABSTRACT

A profile clamp includes a profile strip and an annular sealing element, the profile strip having two tensioning heads which are interconnected by a tensioning element. Furthermore, a corresponding sealing element and a conduit connection assembly include a profile clamp of this type. So that the sealing element is held so that it cannot rotate on the profile clamp, the sealing element has a retaining lug which extends radially outwards and is held on the tensioning element.

17 Claims, 2 Drawing Sheets

(51) Int. Cl.
*F16L 23/18* (2006.01)
*F16J 13/06* (2006.01)

(58) Field of Classification Search
CPC .. F16L 17/04; F16L 17/06; F16L 21/06; F16J 13/065
USPC ....... 285/410, 241, 242, 236, 337, 364, 367, 285/406, 420, 421
See application file for complete search history.

(56) References Cited

U.S. PATENT DOCUMENTS

| | | | | |
|---|---|---|---|---|
| 2,377,510 | A | * 6/1945 | Newell | F16L 17/04 285/367 |
| 6,386,593 | B1 | 5/2002 | Slais et al. | |
| 8,632,105 | B2 | * 1/2014 | Krueger | F16L 23/08 285/420 |
| 9,016,731 | B2 | 4/2015 | Rigollet | |
| 9,568,130 | B2 | 2/2017 | Henrich et al. | |
| 2008/0197627 | A1 | * 8/2008 | Baudoin | F16L 23/08 |
| 2012/0274063 | A1 | * 11/2012 | Kennedy, Jr. | F16L 23/08 285/364 |
| 2013/0207389 | A1 | 8/2013 | Rigollet | |
| 2014/0217728 | A1 | * 8/2014 | Ghirardi | F16L 23/08 285/420 |

FOREIGN PATENT DOCUMENTS

| | | |
|---|---|---|
| DE | 3729109 A1 | 3/1989 |
| DE | 19846475 A1 | 4/2000 |
| DE | 102008010871 A1 | 9/2009 |
| DE | 102011116768 A1 | 4/2013 |
| EP | 1245889 A1 | 10/2002 |
| EP | 1267049 A1 | 12/2002 |
| GB | 1214847 A | 12/1970 |
| JP | S5870562 U | 5/1983 |
| JP | 2011027256 A * | 2/2011 ............. F16L 23/18 |
| JP | 2011027256 A | 2/2011 |
| JP | 2011052826 A | 3/2011 |
| JP | 2013540953 A | 11/2013 |
| KR | 20130095743 A | 8/2013 |
| WO | WO2005079297 A2 | 9/2005 |
| WO | WO2009044024 A2 | 4/2009 |

OTHER PUBLICATIONS

International Search Report for PCT/EP2017/053330, dated May 17, 2017, 3 pages.
English Translation of International Search Report for PCT/EP2017/053330, dated May 17, 2017, 2 pages.
1st German Office Action for DE 10 2016 103 687.0 dated Feb. 7, 2017, 6 pages.
Korean Office Action for Korean Application No. 1020197008238 dated Apr. 22, 2020 (10 pages).
First Japanese Office Action for Japanese Application No. 2018-545200 dated Sep. 24, 2019 (9 pages).
English Translation of First Japanese Office Action for Japanese Application No. 2018-545200 dated Sep. 24, 2019 (18 pages).
First Korean Office Action for Korean Application No. 10-2018-7028200 dated Oct. 30, 2019 (10 pages).
English Translation of First Korean Office Action for Korean Application No. 10-2018-7028200 dated Oct. 30, 2019 (10 pages).

* cited by examiner

PROFILE CLAMP COMPRISING A SEALING ELEMENT, SEALING ELEMENT FOR A PROFILE CLAMP AND CONDUIT CONNECTION ASSEMBLY COMPRISING A PROFILE CLAMP OF THIS TYPE

INTRODUCTION

The disclosure relates to a profile clamp having a sealing element as well as to a corresponding sealing element and to a conduit connection assembly having a profile clamp of this type.

Such profile clamps serve, for example, for the fluid-tight connection between two pipe ends which have radially outwardly directed connecting flanges. The profile clamp is then fitted onto said flanges, it being possible to apply axial and radial holding forces as a result of tensioning the profile clamp. A cross section of the profile strip is, generally, realized in a V-shaped or U-shaped manner for this purpose.

A sealing element, which is positioned axially between the connecting flanges, is frequently used in order to achieve a fluid-tight connection. If the sealing element is not fastened on the profile clamp, at least two independent components, namely the profile clamp and the sealing element, have to be handled resulting in the installation of the profile clamp being relatively complicated. The fitter then has to position both the sealing element and the profile clamp in the correct manner with reference to the pipes.

Connecting the sealing element, which is realized as a ring-shaped disk, to the profile strip in a positive locking manner by means of deformable fastening brackets, is consequently disclosed, for example, in DE 602 10 142 T2. The fastening brackets, in this case, can be realized in one piece with the sealing element.

DE 10 2011 116 768 A1 proposes providing the sealing element with spacers which are arranged distributed on the circumference, are elastically deformable and abut against a radial inside surface of the profile clamp. The sealing element is thus held on the profile strip in a non-positive locking manner, it being possible to attach the sealing element in a tool-free manner.

However, said solution does not prevent rotation between the sealing element and the profile strip. Furthermore, there is the risk of the sealing element coming loose when the profile strip is widened.

SUMMARY

Consequently, the object underlying the disclosure is to improve a fastening of the sealing element in the profile clamp.

According to an embodiment, said object is achieved by a profile clamp with the features of claim 1 and by a sealing element with the features of claim 13 and a conduit connection assembly with the features of claim 14. Advantageous designs can be found in the subclaims.

In the case of a profile clamp which comprises a profile strip and a ring-shaped sealing element, wherein the profile strip comprises two tensioning heads which are connected together by means of a tensioning element, it is provided according to an embodiment that the sealing element comprises a radially outwardly protruding retaining lug which is held on the tensioning element.

According to an embodiment, the sealing element is supported therefore not only on the profile strip but is additionally connected to the tensioning element. Said connection, in this case, serves as an anti-rotational mechanism, but can also prevent the sealing element coming loose when the profile clamp is bent open. In this case, the retaining lug extends into a region between the tensioning heads and is easily visible from the outside. The proper securement against displacement of the sealing element inside the profile strip is consequently easily lockable.

In an embodiment, it is preferred for the retaining lug to comprise a bent-around end which encompasses the tensioning element at least in part. The retaining lug, which is realized in particular in one piece with the sealing element, therefore obtains a geometry with which it is able to be held on the tensioning element as a result of simply bending its end around. Production is consequently very simple. In addition, a bent-around end is able to be guided very simply around the tensioning element such that the sealing element is able to be locked in the profile clamp at very little expense. At the same time, the freedom of movement sufficient for the tensioning element can be maintained such that tensioning of the profile clamp is not impaired.

In an embodiment, the sealing element comprises at least one radially outwardly projecting projection which is arranged in the region of a recess of the profile strip. Said radially outwardly projecting projection can serve as additional securement against displacement. The hold of the sealing element inside the profile clamp is consequently improved.

In an embodiment, it is preferred for the projection to be arranged diametrically opposite the retaining lug. The sealing element is thus held at opposite positions on the profile clamp. There is thus a very stable bearing arrangement which lies symmetrically inside the profile strip both in the tensioned and in the non-tensioned state of the profile clamp.

In an embodiment, the projection comprises an angled end portion which lies radially outside the profile strip. Said end portion, in this case, can be fastened, for example, on the outside of the profile strip. However, it is also conceivable for it to encompass said profile strip at least in part and, for example, to enable a fastening in the form of a clip.

In an embodiment, the profile strip comprises two strip halves which are connected together by means of a flexible bridge element, wherein the recess is formed by a spacing between the strip halves which is bridged by the bridge element. The bridge element provides a flexibility necessary for bending the profile clamp open such that the profile clamp is also able to be mounted from the inside on larger flanges. By the recess, which is bridged by the bridge element, being utilized for the projection, no further recesses are necessary on the profile strip.

In an embodiment, it is preferred for the radial projection of the sealing element to be connected to the bridge element in particular by means of the angled end portion. In this case, it is possible to provide a clip connection. As an alternative to this, the end portion can be welded to the bridge element or an embossed connection can be provided.

The sealing element can comprise at least one first radially inwardly projecting tab for additional securement against displacement on the flange. Said tab can then engage in positionally corresponding recesses on the flange and thus also fix the profile clamp in the circumferential direction. It is possible, as a result, to mount the profile clamp on the flange with one hand.

In an embodiment, it is preferred for the sealing element to comprise a second radially inwardly projecting tab which is at a spacing from the first inwardly projecting tab in the circumferential direction. On the one hand, forces occurring in the circumferential direction are thus conceivably able to be better absorbed and securement against displacement improved, on the other hand orientation of the clamp with reference to the flange is predetermined in dependence on the positioning of the tabs.

In an embodiment, it is preferred for the first tab and the second tab to comprise different dimensions, wherein in particular an extent in the circumferential direction is different. The position of the sealing element and of the profile clamp on the flange is predetermined precisely with such a design.

The first tab and the second tab are arranged at a same distance from the retaining lug in the circumferential direction. The tabs, in this case, are arranged in particular in the region of the tensioning jaws. Consequently, there is a symmetrical arrangement, it being possible, however, for the dimensions of the tabs to differ.

In an embodiment, the sealing element comprises at least one, in particular two radially inwardly projecting, elastically deformable fingers. Pre-tensioning can be exerted on the flanges by way of said fingers in order to enable a non-positive locking hold of the sealing element on the flange. As a result, there is simple pre-positioning.

In an embodiment, the object named in the introduction is achieved by a sealing element for a profile clamp, wherein the sealing element comprises a radially outwardly extending retaining lug which is securable on a tensioning element. By means of the retaining lug, an additional connection is produced between the profile clamp and the sealing element, which additional connection also prevents rotation between the sealing element and the profile clamp. In this case, the retaining lug can be realized, in particular in one piece with the sealing element.

In an embodiment, the object named in the introduction is also achieved by a conduit connection assembly comprising a conduit end on which is realized a flange, on which a profile clamp as claimed in one of claims 1 to 12 is arranged. The profile clamp, in this case, can be pre-assembled on the conduit end or the flange and held there in a state not yet tensioned or hardly tensioned until it is connected to a second conduit end.

In an embodiment, it is preferred for the flange to comprise at least one depression in which the tab of the sealing element engages. A positive locking connection is consequently produced between the sealing element and the flange which ensures the not yet tensioned profile clamp is positioned in an anti-rotational manner on the conduit end. The connection to a second conduit end is consequently made much easier, it being possible to operate the profile clamp with one hand.

BRIEF DESCRIPTION OF THE FIGURES

The disclosure is described in more detail below by way of preferred exemplary embodiments in conjunction with the drawings, in which.

DETAILED DESCRIPTION

Figure 1:
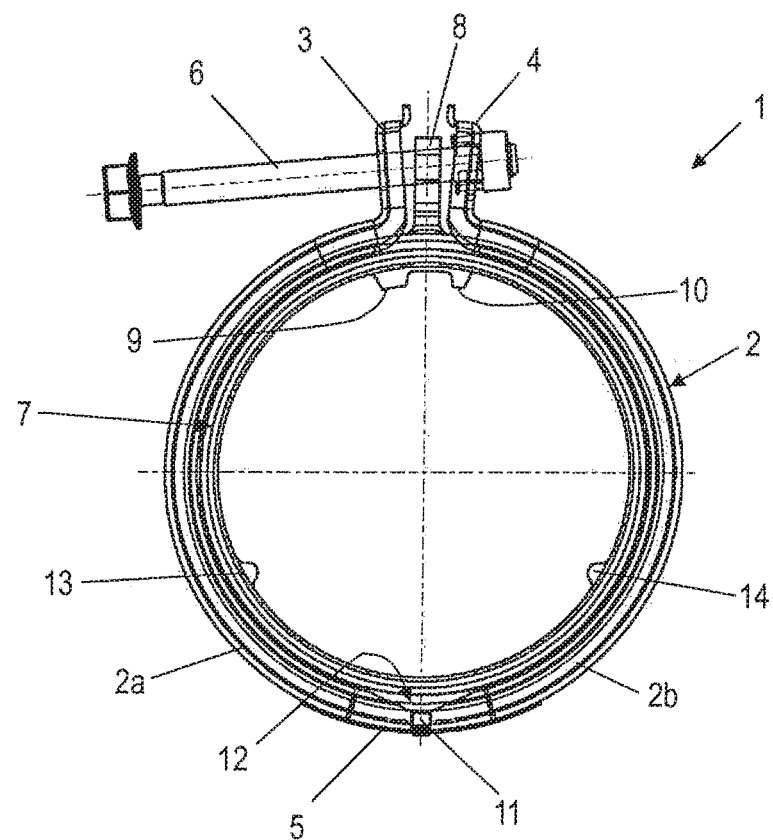
FIG. 1 shows a profile clamp with a sealing element in a part-tensioned state.

FIG. 1 shows an embodiment of a profile clamp 1 which comprises a profile strip 2 which is provided with tensioning jaws 3, 4 on its ends. Said tensioning jaws 3, 4 are produced as a result of bending the profile strip 2 correspondingly.

The profile strip 2 comprises two strip halves 2a, 2b which are connected together by means of a bridge element 5. The bridge element 5, in this case, is arranged opposite the tensioning jaws 3, 4, which are connected together by means of a tensioning element 6 in the form of a tensioning screw.

A sealing element 7 is arranged inside the profile strip 2. The sealing element 7 comprises a radially outwardly extending retaining lug 8 which is connected to the tensioning element 6 such that the tensioning element 6 is still able to move to a sufficient extent. The tensioning element 6 can thus be pivoted in relation to the retaining lug 8 and rotation of the tensioning element 6, which is necessary for tensioning the profile clamp 1, is not impeded by the retaining lug 8.

The sealing element 7 additionally comprises a first radially inwardly projecting tab 9 and a second radially inwardly projecting tab 10, which are realized approximately in the region of the tensioning jaws 3, 4. The first tab 9 and the second tab 10 have different dimensions. The second tab 10 thus extends in the circumferential direction over a larger region than the first tab 9. A portion of the first tab and of the second tab 9, 10 with reference to the retaining lug 8 is, however, substantially the same such that a symmetrical arrangement is produced.

The sealing element 7 additionally comprises a projection 11 which is arranged diametrically opposite the retaining lug 8. The projection 11 is situated, in this case, in the region of a recess 12 of the profile strip. The recess 12 enables the necessary elasticity of the profile strip 2 such that the profile clamp 1 is able to be bent open by a sufficient amount in order to be able to be fitted onto a flange.

Both the retaining lug 8 and the projection 11 can be realized, in this case, in one piece with the sealing element 7. Both serve the purpose of locking the sealing element 7 in relation to the profile strip 2 or the profile clamp 1 against rotation. Reliable securement against displacement is obtained in this way.

In addition, the sealing element 7 comprises two inwardly projecting fingers 13, 14 which are elastically deformable and can be placed under pre-tension on a flange of a conduit end.

Figure 2:
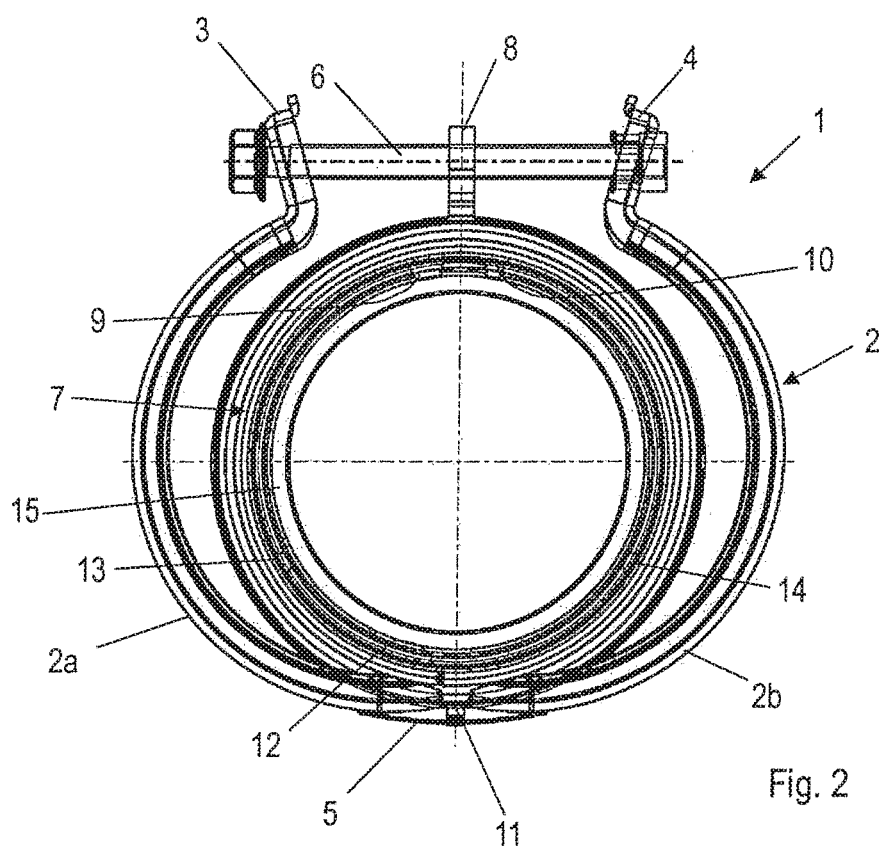
FIG. 2 shows a profile clamp on a flange in the opened state.

FIG. 2 shows the profile clamp 1 in the open state in which it is fitted onto a flange 15 of a conduit end. It can be seen that the sealing element 7 is additionally situated symmetrically inside the profile strip 2, being held securely by means of the projection 11 and the retaining lug 8. Rotation of the sealing element 7 in relation to the profile strip 2 is consequently excluded.

Figure 3:
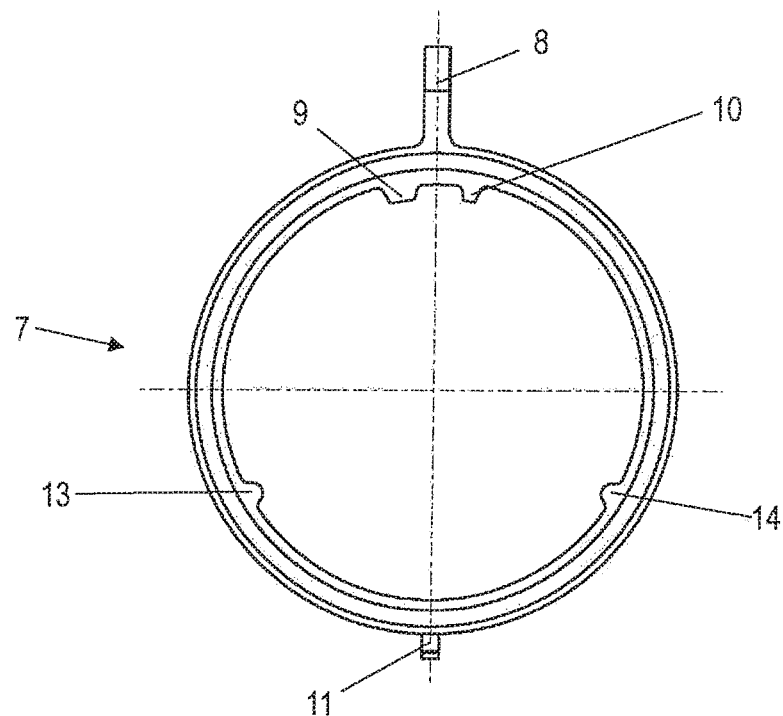
FIG. 3 shows a top view of the sealing element.

FIG. 3 shows the sealing element 7 without a profile clamp 1. The one-piece design of the sealing element 7 with the retaining lug 8, the tabs 9, 10, the projection 11 and the fingers 13, 14 can be easily seen in this case.

Figure 4:
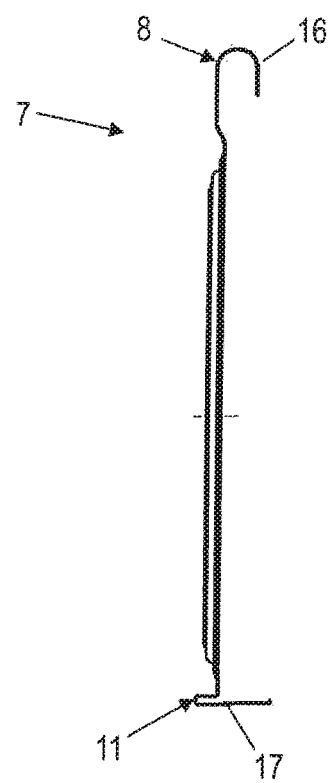
FIG. 4 shows a side view of the sealing element.

A bent end 16 of the projection 11 can be seen in the side view of the sealing element 7 shown in FIG. 4. The tensioning element 6 is engaged-around with said bent end 16 and a positive-locking fastening is thus achieved which allows the tensioning element 6 sufficient freedom of movement.

The projection 11 comprises an angled end portion 17 which runs in the axial direction. Said end portion 17 is arranged radially outside the profile strip 2 and is connected to an outside surface of the profile strip 2 or to the bridge element 5. In this case, different connecting techniques can be used, for example welding, bonding or embossing.

The design according to an embodiment enables secure positioning of the sealing element inside the profile clamp irrespective of the state of opening of the profile clamp. In particular when two fastening regions, namely the retaining lug and the projection, are provided, there is a very sturdy bearing arrangement. In particular, as a result of the additional tabs, securement against displacement can be effected, in this case, not only between the profile clamp and the sealing element but also in relation to the flange of the conduit end. This makes one-handed assembly possible, where the profile clamp does not need to be secured to an extra extent. The profile clamp is also securely pre-positioned on the flange of a conduit end which makes it possible to transport the conduit end together with the profile clamp.

The disclosure is not restricted to one of the afore-named exemplary embodiments but rather is modifiable in diverse ways. In particular, the form of the retaining lug and/or of the projection can deviate from the representation shown. The positioning of the tabs and of the fingers can also vary significantly depending on the requirements.

All features and advantages emanating from the claims, the description and the drawing, including structural details, spatial arrangement and method steps, can be essential to the invention both in their own right and in the most varied combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCES

1 Profile clamp
2 Profile strip
3 Tensioning jaw
4 Tensioning jaw
5 Bridge element
6 Tensioning element
7 Sealing element
8 Retaining lug
9 First tab
10 Second tab
11 Projection
12 Recess
13 Finger
14 Finger
15 Flange
16 End
17 Portion

The invention claimed is:

1. A profile clamp comprising a profile strip and a ring-shaped sealing element, wherein the profile strip comprises two tensioning heads which are connected together by a tensioning element, wherein the sealing element comprises a radially outwardly protruding retaining lug which is held on the tensioning element, wherein the retaining lug comprises a hook with a free bent-around end which encompasses the tensioning element in part.

2. The profile clamp as claimed in claim 1, wherein the sealing element comprises at least one radially outwardly projecting projection which is arranged in the region of a recess of the profile strip.

3. The profile clamp as claimed in claim 2, wherein the projection is arranged diametrically opposite the retaining lug.

4. The profile clamp as claimed in claim 2, wherein the projection comprises an angled end portion which lies radially outside the profile strip.

5. The profile clamp as claimed in claim 4, wherein the profile strip comprises two strip halves which are connected together by a flexible bridge element, wherein the recess is formed by a spacing between the strip halves which is bridged by the bridge element.

6. The profile clamp as claimed in claim 5, wherein the radial projection of the sealing element is connected to the bridge element.

7. The profile clamp as claimed in claim 6, wherein the radial projection of the sealing element is connected to the bridge element by the angled end portion.

8. The profile clamp as claimed in claim 1, wherein the sealing element comprises at least one first radially inwardly projecting tab.

9. The profile clamp as claimed in claim 8, wherein the sealing element comprises a second radially inwardly projecting tab which is at a spacing from the first inwardly projecting tab in the circumferential direction.

10. The profile clamp as claimed in claim 9, wherein the first tab and the second tab comprise different dimensions.

11. The profile clamp as claimed in claim 10, wherein an extent in the circumferential direction of the first tab and second tab is different.

12. The profile clamp as claimed in claim 9, wherein the first tab and the second tab are arranged at a same distance from the retaining lug in the circumferential direction.

13. The profile clamp as claimed in claim 1, wherein the sealing element comprises at least one radially inwardly projecting, elastically deformable finger.

14. The profile clamp as claimed in claim 1, wherein the retaining lug has an open end that accepts the tensioning element, the open end established in part by a free end of the hook.

15. The profile clamp as claimed in claim 1, wherein the hook has a free end, and the encompassing of the tensioning element by the hook is incomplete due to the free end of the hook.

16. A conduit connection assembly comprising a conduit end on which is realized a flange, on which a profile clamp as claimed in claim 1 is arranged.

17. The conduit connection assembly as claimed in claim 16, wherein the flange comprises at least one depression in which at least one radially inwardly projecting tab of the sealing element engages.

* * * * *